United States Patent
Abe

(10) Patent No.: US 9,469,270 B2
(45) Date of Patent: Oct. 18, 2016

(54) LEG AIRBAG APPARATUS AND AUTOMOBILE

(71) Applicant: TAKATA CORPORATION, Minato-ku, Tokyo (JP)

(72) Inventor: Kazuhiro Abe, Tokyo (JP)

(73) Assignee: TAKATA CORPORATION, Tokyo (JP)

( * ) Notice: Subject to any disclaimer, the term of this patent is extended or adjusted under 35 U.S.C. 154(b) by 0 days.

(21) Appl. No.: 14/532,604

(22) Filed: Nov. 4, 2014

(65) Prior Publication Data

US 2015/0197210 A1 Jul. 16, 2015

(30) Foreign Application Priority Data

Jan. 10, 2014 (JP) ................ 2014-002887

(51) Int. Cl.

| | |
|---|---|
| B60R 21/233 | (2006.01) |
| B60R 21/2338 | (2011.01) |
| B60R 21/206 | (2011.01) |
| B60R 21/2342 | (2011.01) |
| B60R 21/231 | (2011.01) |
| B60R 21/00 | (2006.01) |

(52) U.S. Cl.
CPC ......... *B60R 21/233* (2013.01); *B60R 21/206* (2013.01); *B60R 21/231* (2013.01); *B60R 21/2338* (2013.01); *B60R 21/2342* (2013.01); *B60R 2021/0009* (2013.01); *B60R 2021/0023* (2013.01); *B60R 2021/0051* (2013.01); *B60R 2021/23169* (2013.01); *B60R 2021/23308* (2013.01); *B60R 2021/23324* (2013.01); *B60R 2021/23382* (2013.01); *B60R 2021/23386* (2013.01)

(58) Field of Classification Search
CPC .............. B60R 21/231; B60R 21/233; B60R 21/2338; B60R 21/206; B60R 2021/23169; B60R 2021/23308; B60R 2021/23316; B60R 2021/23324; B60R 2021/23382; B60R 2021/0051

USPC .............. 280/730.1, 729, 743.1, 743.2
See application file for complete search history.

(56) References Cited

U.S. PATENT DOCUMENTS

| | | |
|---|---|---|
| 6,916,039 B2 | 7/2005 | Abe |
| 7,380,823 B2 | 6/2008 | Abe et al. |
| 8,505,969 B2 | 8/2013 | Mendez |
| 2008/0122205 A1* | 5/2008 | Imamura ............. B60R 21/203 280/730.1 |
| 2013/0113190 A1* | 5/2013 | Schneider ............. B60R 21/206 280/728.2 |
| 2015/0115579 A1* | 4/2015 | Abramoski et al. ... B60R 21/231 280/730.1 |

FOREIGN PATENT DOCUMENTS

JP 3186163 B2 7/2001

* cited by examiner

*Primary Examiner* — Keith Frisby
(74) *Attorney, Agent, or Firm* — Manabu Kanesaka

(57) ABSTRACT

A leg airbag apparatus can restrain occupant legs from moving obliquely forward in an offset collision and in the leg airbag apparatus, an airbag inflates and deploys early without using a high-output inflator, and an automobile includes the leg airbag apparatus. An airbag includes a body part that inflates in front of an occupant, and a projecting part that projects only outward in a vehicle body width direction from at least an upper portion of the body part. In an inflated state of the airbag, a length from an occupant center line of the airbag to an outer end of the projecting part in the vehicle body width direction is longer than a length to an inner end in the vehicle body width direction. The projecting part is protruded to the vehicle body rear side by being pulled by an outer tether.

13 Claims, 11 Drawing Sheets

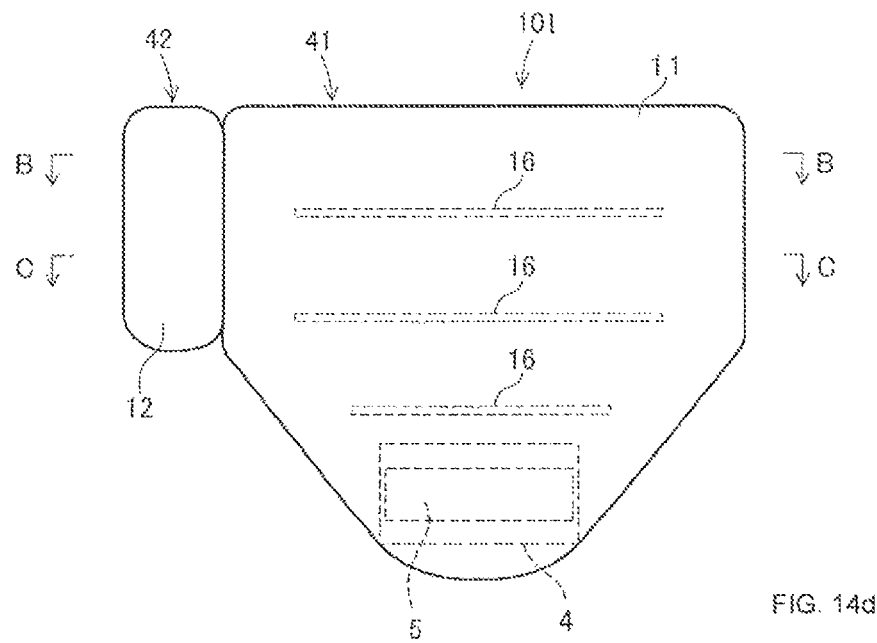
FIG. 14a
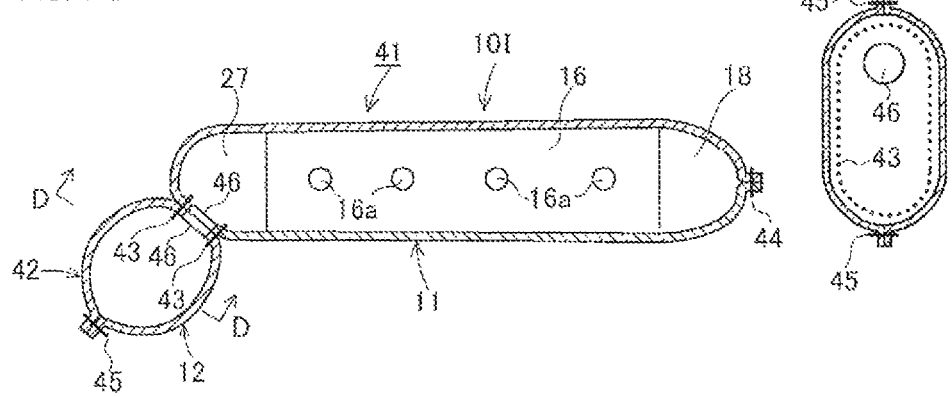
FIG. 14b
FIG. 14d
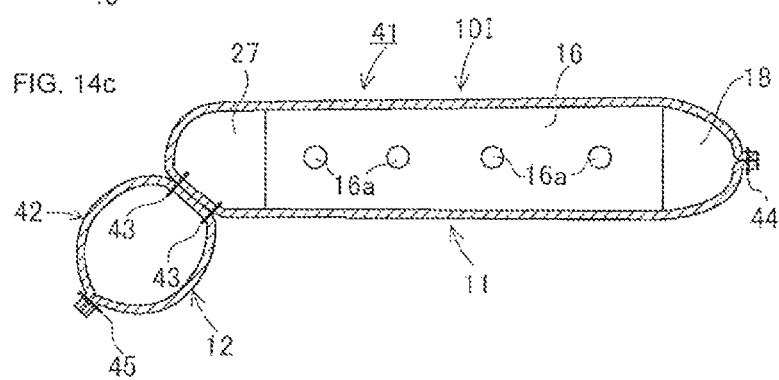
FIG. 14c

LEG AIRBAG APPARATUS AND AUTOMOBILE

RELATED APPLICATIONS

The present application is based on, and claims priority from, Japanese Application No. JP2014-002887 filed Jan. 10, 2014, the disclosure of which is hereby incorporated by reference herein in its entirety.

Technical Field

The present invention relates to a leg airbag apparatus that restrains legs of an occupant in case of collision of an automobile, and to an automobile including the leg airbag apparatus.

BACKGROUND ART

There are leg airbag apparatuses each of which restrains the legs of an occupant by inflating an airbag in front of the legs, for example, in case of a head-on collision of an automobile and includes an airbag to inflate in front of the legs of the vehicle occupant and an inflator for inflating the airbag (PTL 1 to PTL 3).

PTL 1 describes that projections projecting toward the seat are provided on both sides of an airbag in the width direction to prevent the legs of an occupant from opening out in a collision of an automobile.

PTL 2 describes an occupant leg protection apparatus in which a tether is provided within an airbag to connect an occupant-side foundation cloth and an instrument-panel-side foundation cloth of the airbag. In this occupant leg protection apparatus, the inflation thickness of the airbag is regulated by the tether.

PTL 3 describes a knee airbag that inflates downward from a lower portion of a dashboard and then inflates upward along the dashboard.

CITATION LIST

Patent Literature

[PTL 1] Japanese Unexamined Patent Application Publication No. 5-208653
[PTL 2] Japanese Unexamined Patent Application Publication No. 2005-239054
[PTL 3] Japanese Unexamined Patent Application Publication No. 2011-136682

SUMMARY OF INVENTION

Technical Problem

When the automobile encounters an oblique collision or an offset collision (small overlap oblique collision), the occupant legs are going to move obliquely forward. In the airbag of each of PTL 1 to PTL 3, when the right-left width of the airbag is increased, the legs are restrained from moving obliquely forward in an offset collision. In this case, however, the capacity of the airbag pronouncedly increases, and it is necessary to adopt an inflator having large output capacity.

An object of the present invention is to provide a leg airbag apparatus that can restrain occupant legs from moving obliquely forward when an automobile encounters an oblique collision or an offset collision and that allows an airbag to inflate and deploy early without using a high-output inflator, and an automobile including the leg airbag apparatus.

Solution to Problem

A leg airbag apparatus according to the present invention includes an airbag that deploys in an area including a position in front of legs of an occupant of an automobile, a retainer that stores the airbag in a folded state, and an inflator that inflates the airbag. The airbag includes a body part that inflates in front of the occupant, and a projecting part that projects only outward in a vehicle body width direction from the body part. In an inflated state of the airbag, a length from an occupant center line of the airbag to an outer end of the projecting part in the vehicle body width direction is longer than a length to an inner end in the vehicle body width direction.

Preferably, the projecting part projects outward in the vehicle body width direction from at least an upper portion of the body part. The projecting part may project outward in the vehicle body width direction from an upper portion of the body part including the uppermost end or from near the upper portion, or may project outward in the vehicle body width direction from an upper portion of the body part excluding the uppermost end or from near the upper portion.

In the present invention, preferably, in the inflated state of the airbag, the length from the occupant center line of the airbag to the outer end of the projecting part in the vehicle body width direction is longer by 80 to 170 mm than the length to the inner end in the vehicle body width direction.

In the present invention, preferably, in the inflated state of the airbag, the projecting part protrudes from the body part to a vehicle body rear side. In this case, the projecting part preferably protrudes by 80 to 170 mm from the body part to the vehicle body rear side.

In an embodiment of the present invention, a tether that connects the projecting part and the body part is provided on an occupant side of the airbag, and the tether protrudes the projecting part to the vehicle body rear side where the airbag inflates.

In an embodiment of the present invention, a tuck portion is provided near a boundary portion between the projecting part and the body part in an occupant side panel of the airbag such that the projecting part protrudes to the vehicle body rear side when the airbag inflates.

In an embodiment of the present invention, a separating portion is provided to separate the projecting part and the body part, and a communicating portion that allows the projecting part and the body part to communicate with each other is provided in an upper portion or an intermediate portion in an up-down direction of the separating portion. Gas from the inflator is supplied to the body part, and then flows from the body part into the projecting part through the communicating portion.

In an embodiment of the present invention, the separating portion is a seam that sews an occupant side panel and a non-occupant side panel of the airbag. This seam may be a tear seam that tears when the airbag inflates.

In an embodiment of the present invention, an upper portion of the tear seam extends inward in the vehicle body width direction.

In an embodiment of the present invention, an upper portion of the tear seam extends inward in the vehicle body width direction, and further extends downward.

In an embodiment of the present invention, the separating portion is formed by a panel.

In an embodiment of the present invention, the airbag includes a main bag that forms the body part, and a sub-bag that forms the projecting part, and the sub-bag is sewn to the main bag.

In an embodiment of the present invention, an interior of the body part of the airbag is divided into a plurality of chambers by an inner tether extending in the vehicle body width direction.

In an embodiment of the present invention, the airbag is folded up after the projecting part is folded toward a non-occupant side of the body part.

In the present invention, preferably, when the inflator starts, inflation of the projecting part is completed after inflation of the body part is completed.

An automobile according to the present invention includes the leg airbag apparatus of the present invention.

Advantageous Effects of Invention

The airbag in the leg airbag apparatus of the present invention includes the body part that deploys in the area including the position in front of the occupant legs, and the projecting part located only on the outer side of the body part in the vehicle body width direction. This projecting part restrains the occupant legs from moving obliquely forward when the automobile encounters an oblique collision or an offset collision. Since the projecting part is provided only on the outer side of the body part in the vehicle body width direction in this airbag, the capacity of the airbag does not become excessive. Therefore, the airbag inflates and deploys early without using a high-output inflator.

In the embodiment of the present invention, the airbag inflates such that the projecting part protrudes from the body part to the vehicle body rear side. The projecting part protruding rearward restrains the occupant legs from moving obliquely forward.

In the embodiment of the present invention, the separating portion is provided to separate the projecting part and the body part, and the communicating portion that allows the body part and the projecting part to communicate with each other is provided in the upper portion or the intermediate portion in the up-down direction of the separating portion such that gas from the inflator is first supplied to the body part. In the airbag of this embodiment, the gas from the inflator inflates the body part early, and then inflates the projecting part.

When the separating portion is formed by a tear seam and the airbag internal pressure in the inflated body part of the airbag becomes higher than or equal to a predetermined pressure, the tear seam tears, and the projecting part inflates positively. Thus, the inflation completion time of the projecting part and the inflation completion time of the body part can be adjusted. Further, the leg airbag can be smoothly inflated between the knees and shins of the occupant and a lower instrument panel.

In this case, in the case in which the upper portion of the tear seam is extended inward in the vehicle body width direction and further extended downward, stress concentrates at the upper portion of the tear seam when the airbag internal pressure increases, and the tear seam starts tearing from the upper portion of the tear seam.

When this airbag is folded up after the projecting part is folded toward the non-occupant side of the body part, as the airbag inflates and deploys, the projecting part inflates and deploys to be put between the occupant legs and the vehicle interior member.

BRIEF DESCRIPTION OF DRAWINGS

FIG. 14(a) is a front view of an airbag according to a further embodiment, FIGS. 14(b) and 14(c) are cross-sectional views taken along lines B-B and C-C of FIG. 14(a), respectively, and FIG. 14(d) is a cross-sectional view taken along line D-D of FIG. 14(b).

DESCRIPTION OF EMBODIMENTS

Embodiments of the present invention will be described below with reference to the drawings. In the following description, the front-rear direction and the right-left direction refer to the front-rear direction and the right-left direction of an automobile equipped with a leg airbag apparatus. Any of the leg airbag apparatuses of the following embodiments is installed in front of the left seat in the automobile. A leg airbag apparatus installed in front of the right seat has a structure symmetrical to those of the following leg airbag apparatuses.

Figure 1:
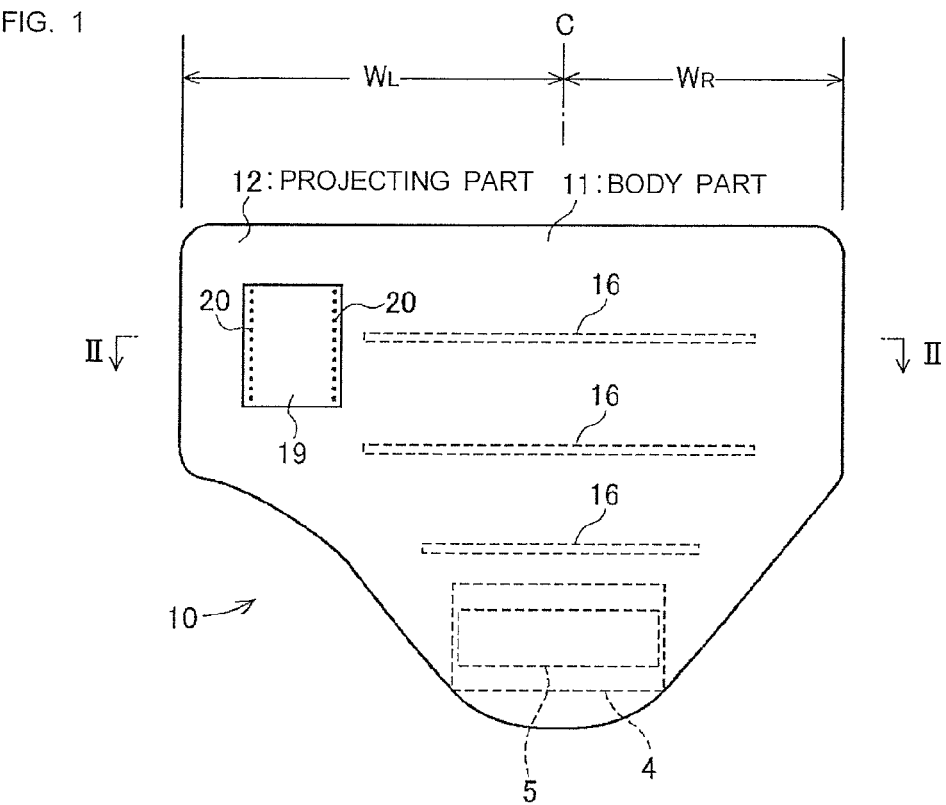
FIG. 1 is a front view of an airbag in a leg airbag apparatus according to an embodiment.
Figure 2:
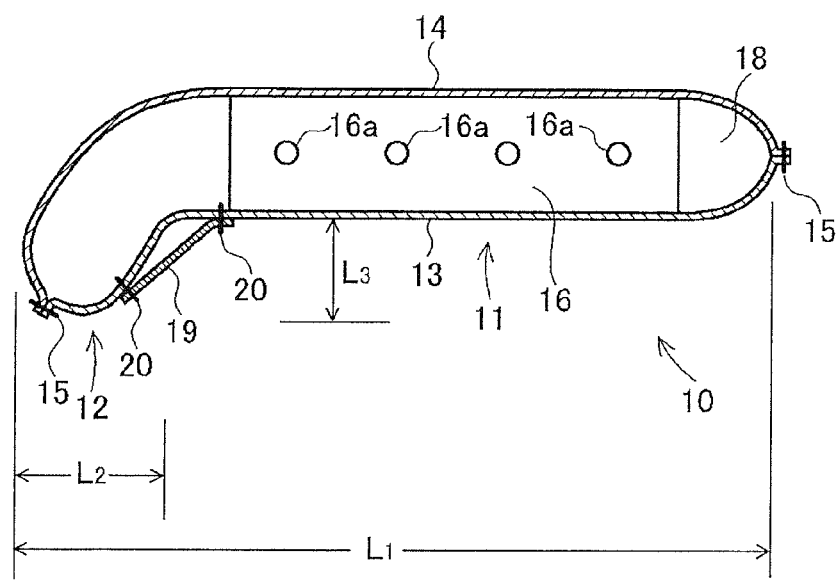
FIG. 2 is a cross-sectional view taken along line II-II of FIG. 1.
Figure 3:
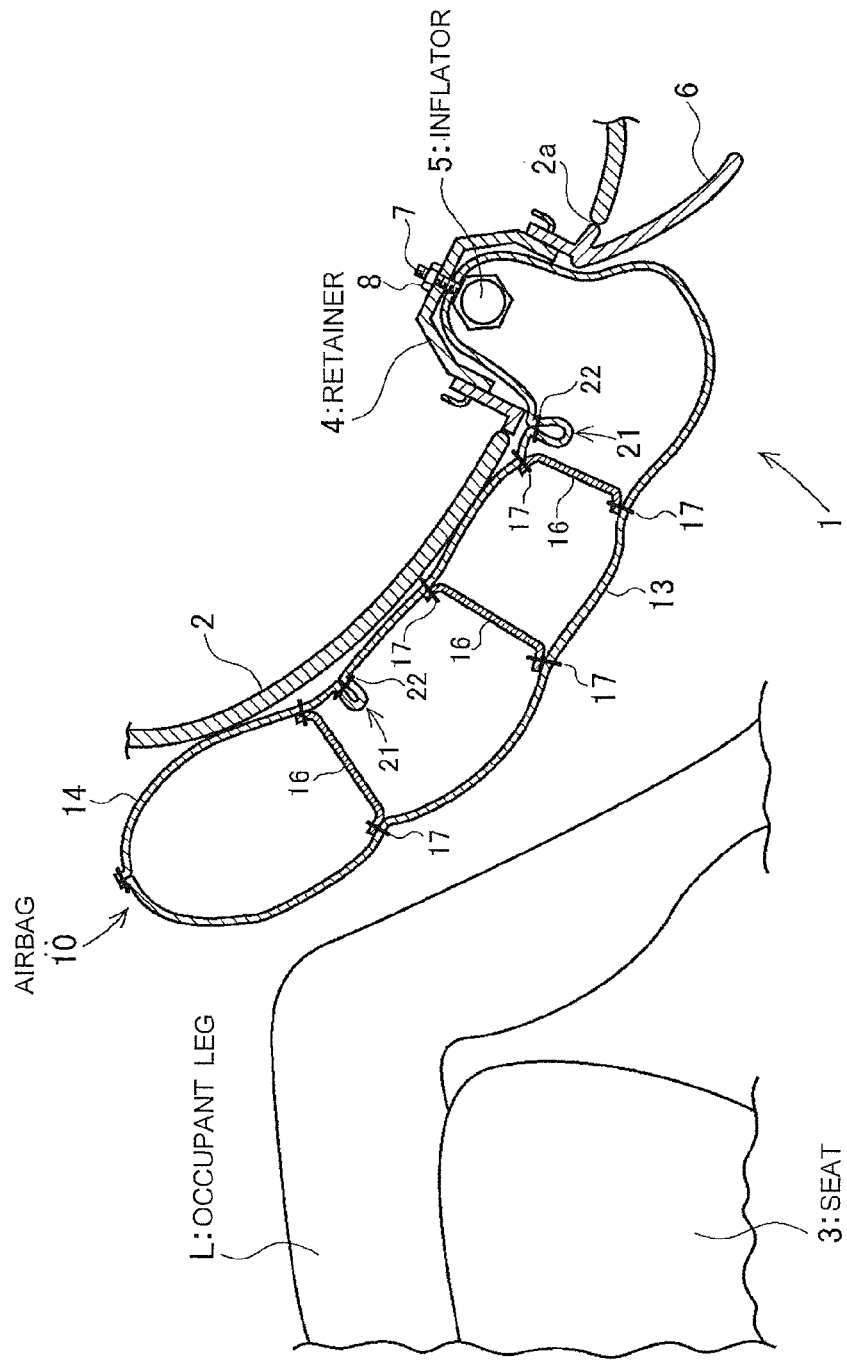
FIG. 3 is a longitudinal sectional view in a vehicle body front-rear direction of the airbag inflated and deployed along an instrument panel of an automobile.

FIGS. 1 to 3 illustrate a first embodiment. As illustrated in FIG. 3, a leg airbag apparatus 1 is installed in an instrument panel 2 in front of a seat 3.

The leg airbag apparatus 1 includes a container-shaped retainer 4 that is open on the compartment surface side, an airbag 10 stored in the retainer 4, an inflator (gas generator) 5 that inflates the airbag 10, and so on.

The retainer 4 is disposed within an opening 2a provided in the lower part of the instrument panel 2. The airbag 10 is stored in a folded state within the retainer 4. A lid 6 is attached to a front surface of the retainer 4 to cover the folded body of the airbag 10. This lid 6 is normally disposed to be substantially flush with the instrument panel 2, and pivots open on its front end into the compartment when the airbag 10 inflates, as illustrated in FIG. 3.

The opening 2a is provided at a height lower than the height near a seating surface of the seat 3. While the opening 2a is provided in a downward-facing surface of the instrument panel 2 in this embodiment, it may be provided at a position closer to the occupant side.

The inflator 5 is attached to the retainer 4 by a bolt 7 and a nut 8. The bolt 7 may stand from the inflator 5, or may stand from a holder that holds the inflator 5. The inflator 5 is disposed within the airbag 10. The bolt 7 is inserted in a small hole or a slit provided in the airbag 10 and a bolt insertion hole of the retainer 4, and the nut 8 is secured thereto. Thus, the inflator 5 is fixed to the retainer 4, and the airbag 10 is also connected to the retainer 4.

Figure 7A:
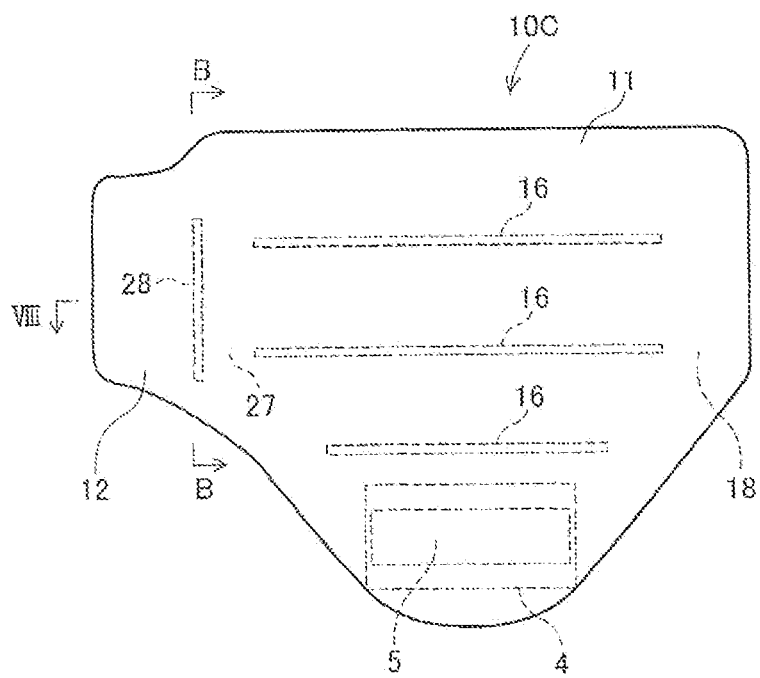
FIG. 7(a) is a front view of an airbag according to a further embodiment.
Figure 7B:
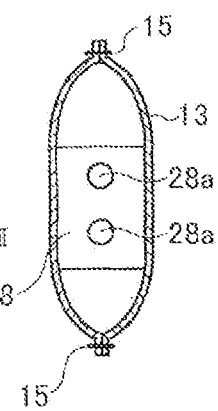
FIG. 7(b) is a cross-sectional view taken along line B-B of FIG. 7(a).

The airbag 10 includes a body part 11 that inflates and deploys in front of the occupant, and a projecting part 12 that projects outward in the vehicle body width direction from the body part 11. The projecting part 12 projects outward in the vehicle body width direction from an upper portion of the body part 11. An upper surface of the projecting part 12 and an upper surface of the body part 11 are substantially flush with each other. However, the upper surface of the projecting part 12 may be slightly lower than the upper surface of the body part 11, as illustrated in FIGS. 7(a), 7(b) to be described later.

An occupant opposed side of the airbag 10 is formed by a first panel 13, and a non-occupant side thereof is formed by a second panel 14. Peripheral edge portions of the first panel 13 and the second panel 14 are sewn together with sewing thread 15.

To regulate the inflation thickness of the body part 11, a plurality of inner tethers 16 are provided to connect the panels 13 and 14. The inner tethers 16 extend in the right-left direction, and are sewn to the panels 13 and 14 with sewing thread 17. The inner tethers 16 each have a plurality of gas passage holes 16a.

A space 18 is provided between the right ends of the inner tethers 16 and the right side of the airbag 10.

The right-left width of an upper half of the airbag 10 is equal. The right-left width of a lower half of the airbag 10 decreases toward the downward side. In this airbag 10, a center line C of the body part 11 in the right-left direction is located in front of the center of the automobile seat 3 in the right-left direction. The body part 11 has a shape that is substantially symmetrical with respect to the center line C. Since the projecting part 12 projects leftward from the body part 11, a length $W_L$ from the center line C to a left end of the upper half of the airbag 10 is more than a length $W_R$ from the center line C to a right end of the upper half in a completely inflated state of the airbag 10. Preferably, $W_L$ is more than $W_R$ by 80 to 170 mm, more particularly by 100 to 150 mm.

In this embodiment, an outer tether 19 is provided to connect an occupant opposed surface of the body part 11 and an occupant opposed surface of the projecting part 12. The right and left sides of the outer tether 19 are sewn to the first panel 13 with sewing thread 20. The length between the right sewing thread 20 and the left sewing thread 20 of the outer tether 19 is shorter than the length between the right sewing thread 20 and the left sewing thread 20 of the first panel 13. Thus, when the inflator 5 starts and the airbag 10 inflates in case of collision, the projecting part 12 protrudes from the body part 11 toward the vehicle body rear side.

In this embodiment, as illustrated in FIG. 3, tuck portions 21 are provided in the second panel 14 such that the airbag 10 curves along the instrument panel 2. The tuck portions 21 are formed by pinching the panel 14 and sewing base ends of the tuck portions 21 with sewing thread 22. The tuck portions 21 extend in the right-left direction. While the tuck portions 21 are provided at two upper and lower positions in FIG. 3, they may be provided at one position or three or more positions. The tuck portions 21 may be omitted.

To fold the airbag 10 up, the airbag 10 is spread flat on a flat worktable, and the projecting part 12 is first folded toward the non-occupant side of the body part 11. The projecting part 12 may be folded toward the body part 11 by being folded back only once toward the non-occupant side or being folded a plurality of times in a roll folding manner or a Z-folding manner. The body part 11 on which the folded projecting part 12 is thus superposed is folded in a roll folding manner from the upper side to the lower side to form a roll-folded body. At this time, the rolling direction of the roll folding is the counterclockwise direction, when viewed from the left side surface of the automobile. After that, the lower part of the airbag 10 is folded in a bellows shape to form a laterally long folded body, and the left end and the right end of the laterally long folded body are folded toward the center side such that the laterally long folded body is stowed in the retainer 4. The left end and the right end may be folded toward the center side by being folded back toward the center side only once or being folded a plurality of times in a roll folding manner or a Z-folding manner.

After the folded body of the airbag 10 thus folded up is stowed in the retainer 4, the lid 6 is attached to the retainer 4, so that the leg airbag apparatus 1 is structured.

When the automobile equipped with the leg airbag apparatus 1 encounters an oblique collision, an offset collision, or a head-on collision, the inflator 5 starts, and the airbag 10 inflates and deploys into an area including a position in front of the occupant. The airbag 10 first inflates downward from the retainer 4, and then inflates and deploys along the instrument panel 2 to a position higher than the legs L of the occupant sitting on the seat 3. In this embodiment, the body part 11 inflates prior to the projecting part 12, and the projecting part 12 then projects leftward from the body part 11. Moreover, the projecting part 12 is pulled by the outer tether 19, and inflates and deploys to protrude from the body part 11 to the vehicle body rear side.

As described above, since the body part 11 on which the folded projecting part 12 is superposed is folded in the roll folding manner, the airbag 10 inflates and deploys upward along the instrument panel 2 between the occupant legs and the instrument panel 2. Further, since the projecting part 12 is folded toward the non-occupant side of the body part 11, it inflates and deploys to be put among the left leg of the occupant, the instrument panel 2, and a vehicle body interior side panel. The left ends of the projecting part 12 and the body part 11 restrain the left leg of the occupant, more particularly, the left knee and left shin from moving obliquely forward in an offset collision.

Since the projecting part 12 is provided only on the left side of the body part 11 in this airbag 10, the capacity of the airbag 10 is smaller than when the projecting part 12 is provided on each of the right and left sides. Therefore, the airbag 10 deploys early without using a high-output inflator as the inflator 5.

In a state in which the airbag 10 is freely inflated and inflation is completed, for example, in a state in which inflation of the airbag 10 in the leg airbag apparatus is completed before the leg airbag apparatus is installed in the vehicle body, preferably, a right-left width $L_1$ of the upper part is 500 to 700 mm, more particularly, about 550 to 650 mm, a right-left width $L_2$ of the projecting part 12 is about 100 to 220 mm, more particularly, about 120 to 200 mm, and a protrusion length $L_3$ of the projecting part 12 from the body part 11 toward the vehicle body rear side is 80 to 170 mm, more particularly, about 100 to 150 mm.

Figure 4:
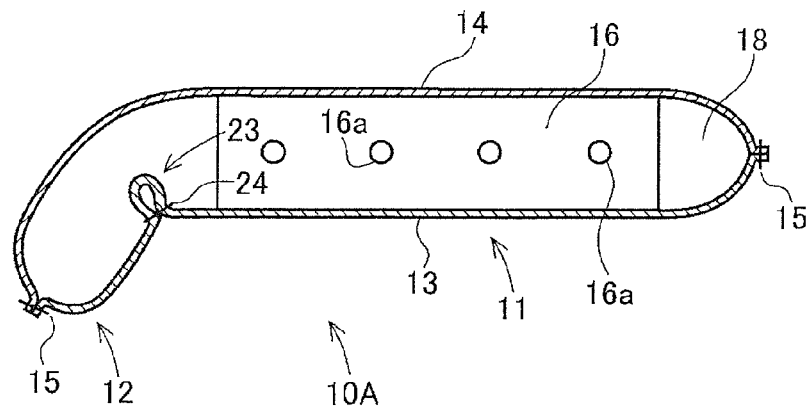
FIG. 4 is a horizontal sectional view of an airbag according to another embodiment.

While the projecting part 12 is protruded from the body part 11 toward the vehicle body rear side by the outer tether 19 in the airbag 10, a projecting part 12 may be protruded from a body part 11 toward the vehicle body rear side by forming a vertical tuck portion 23 in an occupant-side panel 13 such that the vertical tuck portion 23 extends in the up-down direction along a boundary portion between the body part 11 and the projecting part 12, as in an airbag 10A illustrated in FIG. 4. The tuck portion 23 is formed by pinching the panel 13 and sewing a base end of the pinched portion with sewing thread 24.

Other structures of the airbag 10A are the same as those of the airbag 10.

Figure 5:
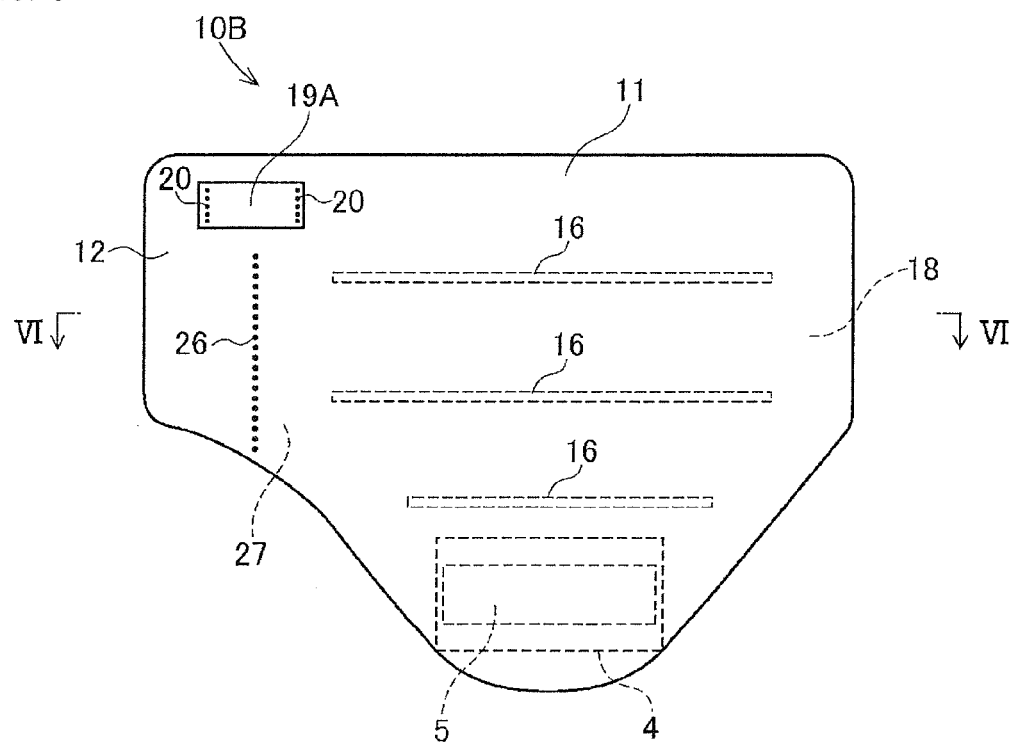
FIG. 5 is a front view of an airbag according to a further embodiment.
Figure 6:
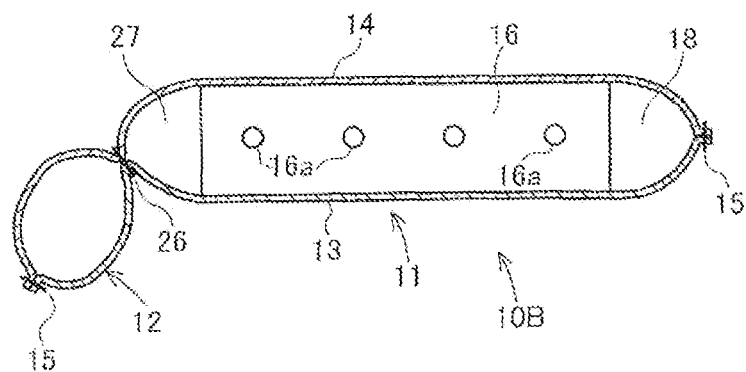
FIG. 6 is a cross-sectional view taken along line VI-VI of FIG. 5.

While the inside of the body part 11 and the inside of the projecting part 12 communicate with each other as a whole in the above-described airbags 10 and 10A, upper parts of a body part 11 and a projecting part 12 may communicate with each other, and a separating portion for separating the body part 11 and the projecting part 12 may be provided on the lower side of the upper parts, as in an airbag 10B illustrated in FIGS. 5 and 6. In FIGS. 5 and 6, a seam 26 with sewing thread is provided as the separating portion. An upper end of the seam 26 is provided apart from an upper end of the airbag 10B. At this portion, the body part 11 and the projecting part 12 communicate with each other. While a lower end of the seam 26 extends to a lower edge of the airbag 10B, it may be provided apart from the lower edge. A space 27 is provided between the seam 26 and inner tethers 16.

When the inflator 5 starts and the airbag 10B having the separating portion inflates, gas flows from an inflator 5 into the body part 11 and inflates the body part 11 first, and then inflates the projecting part 12. Particularly, in this embodiment, the spaces 18 and 27 are provided on opposite sides of the inner tethers 16, and the gas from the inflator 5 flows upward through the spaces 18 and 27. Hence, the body part 11 deploys upward early. The gas that has reached the upper portion of the body part 11 flows into the projecting part 12 through the communicating portion on the upper side of the seam 26, and inflates the projecting part 12 downward from the upper portion. When the automobile encounters an oblique collision or an offset collision, the knees and the shin upper parts of the occupant legs L are going to move obliquely forward. However, since the upper portion of the projecting part 12 inflates early, the knee and the shin upper part of the left leg are restrained early.

In this airbag 10B, an outer tether 19A is provided only in the upper portion. Since the seam 26 is provided, the lower portion of the projecting part 12 easily turns on the seam 26 toward the occupant side, and easily protrudes to the vehicle body rear side along the interior side panel of the automobile, as illustrated in FIG. 6. In the airbag 10B, however, the outer tether 19A may be replaced by an outer tether 19 that is long in the up-down direction, as in the airbag 10.

Figure 8:
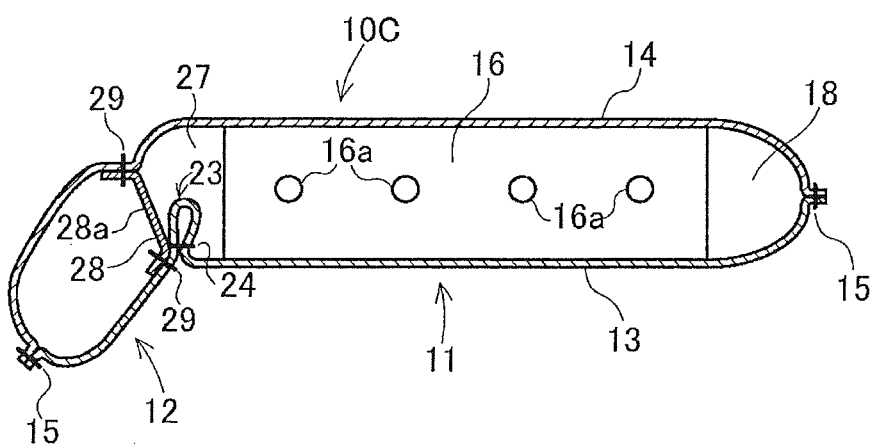
FIG. 8 is a cross-sectional view taken along line VIII-VIII of FIGS. 7(a), 7(b).

While the separating portion is formed by the seam 26 in the airbag 10B of FIGS. 5 and 6, it may be formed by a separation panel 28, as in an airbag 10C illustrated in FIGS. 7 and 8.

The separation panel 28 extends in the up-down direction along a boundary portion between a body part 11 and a projecting part 12. While the separation panel 28 has holes 28a, the holes 28a may be omitted. Both side portions of the separation panel 28 are sewn to panels 13 and 14, respectively, with sewing thread 29. Portions between an upper end and a lower end of the separation panel 28 and an outer peripheral edge of the airbag 10C serve as communicating portions that allow the inside of the body part 11 and the inside of the projecting part 12 to communicate with each other.

In this embodiment, a tuck portion 23 is provided in the occupant-side panel 13 along the separation panel 28. Upon inflation, the airbag 10C bends along the tuck portion 23 so that the projecting part 12 protrudes from the body part 11 to the vehicle body rear side. In this airbag 10C, an outer tether 19 for connecting the body part 11 and the projecting part 12 may be provided instead of the tuck portion 23 or together with the tuck portion 23.

In this airbag 10C, an upper surface of the projecting part 12 is slightly lower than an upper surface of the body part 11.

Figure 9:
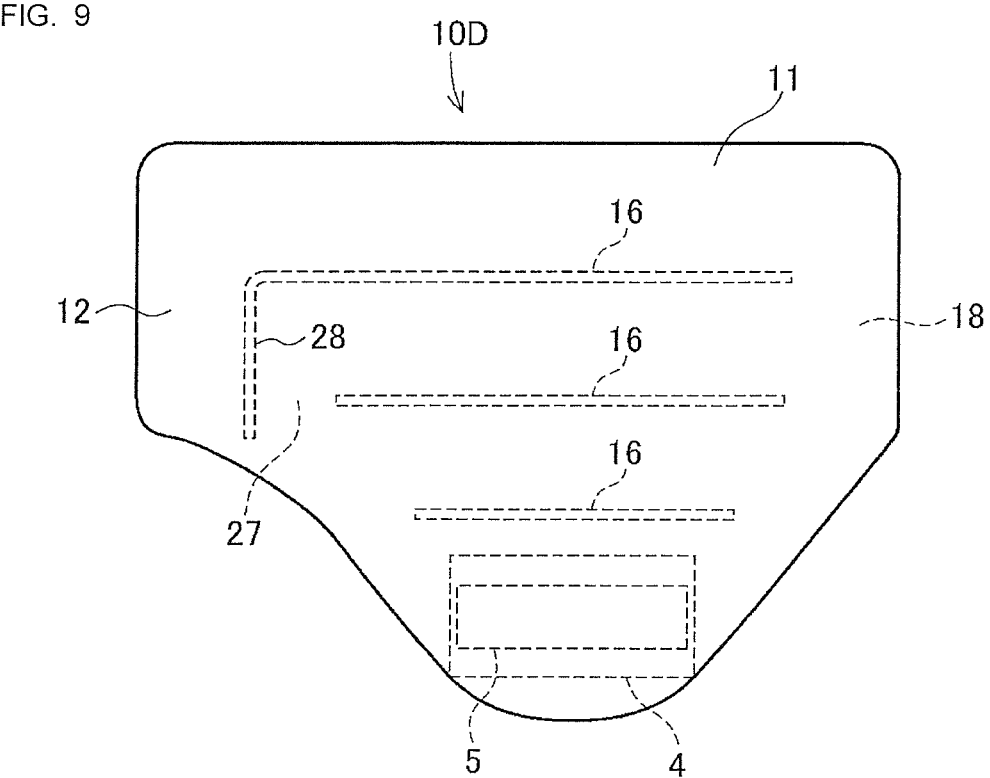
FIG. 9 is a front view of an airbag according to a further embodiment.

While the separation panel 28 is separate from inner tethers 16 in FIGS. 7(a), 7(b) and 8, the separation panel 28 and the uppermost inner tether 16 may be connected as in an airbag 10D illustrated in FIG. 9.

Figure 10:
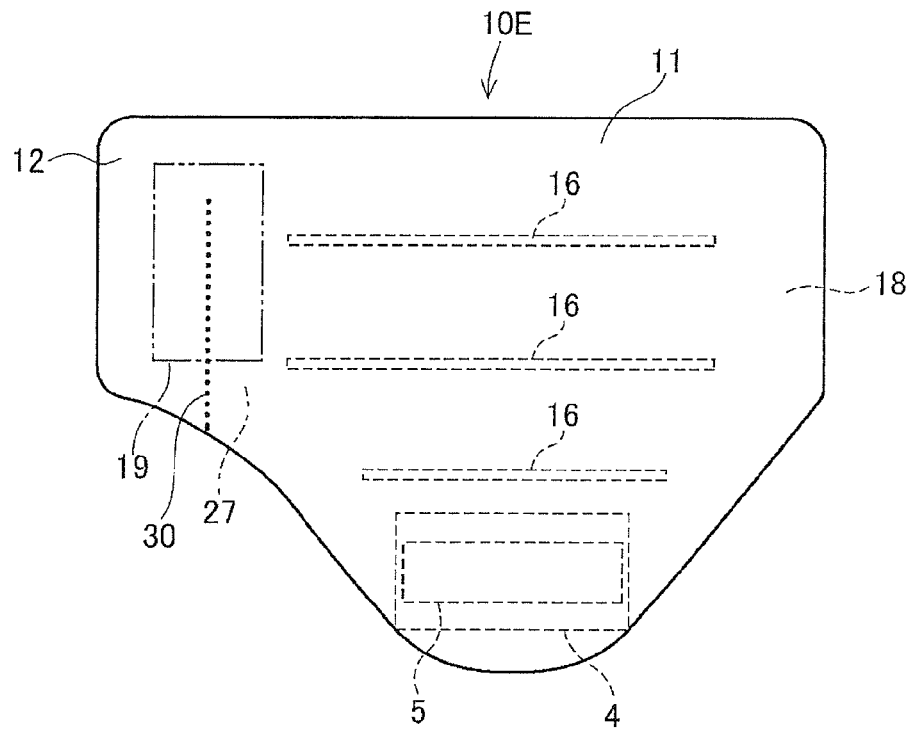
FIG. 10 is a front view of an airbag according to a further embodiment.

In the present invention, the seam 26 of FIGS. 5 and 6 may be a tear seam that tears when the airbag internal pressure becomes high. FIG. 10 illustrates an airbag 10E having such a tear seam, and a tear seam 30 is provided at the same position as the seam 26. An upper end of the tear seam 30 is provided apart from an upper side of the airbag 10E, and this portion allows a body part 11 and a projecting part 12 to communicate with each other. On an occupant side surface of the airbag 10E, an outer tether 19 is provided to connect the body part 11 and the projecting part 12.

When an inflator 5 starts and the airbag 10E inflates, the body part 11 first inflates. Subsequently, gas flows from an upper portion of the body part 11 into the projecting part 12 through the communicating portion, and the projecting part 12 also inflates. When the airbag 10E receives the occupant legs and the internal pressure of the airbag 10E increases, the tear seam 30 tears, and impact is absorbed. In this case, the greatest tension is applied to the uppermost end of the tear seam 30 facing the communicating portion in the upper part of the airbag 10E. Hence, the tear seam 30 starts tearing from the upper end portion, and this tear propagates downward.

Figure 11:
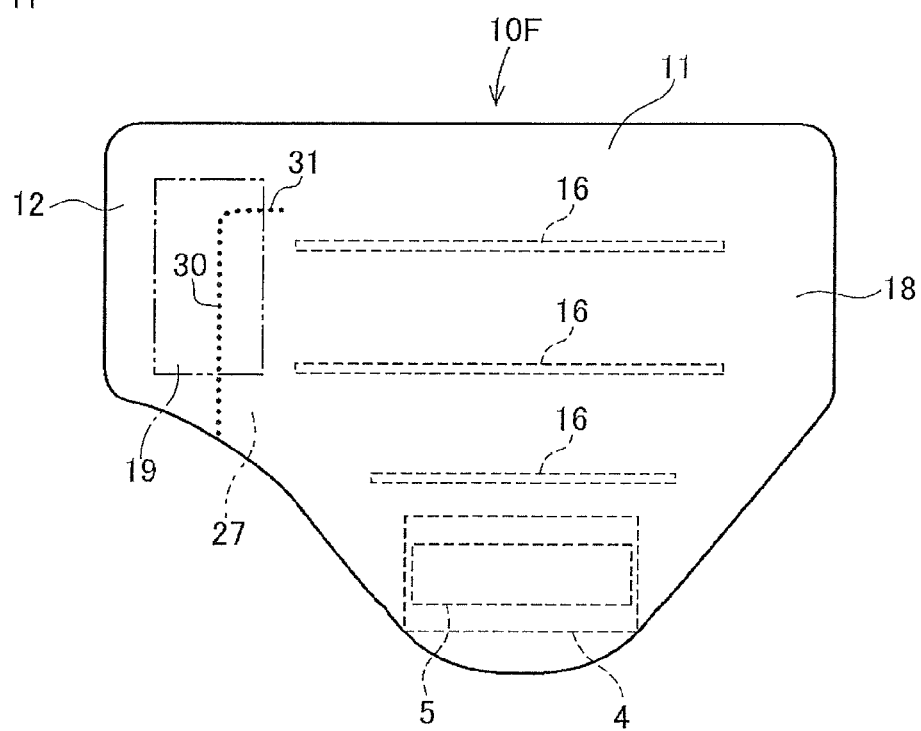
FIG. 11 is a front view of an airbag according to a further embodiment.

While the tear seam 30 is linear such as to extend only in the up-down direction in FIG. 10, as in an airbag 10E illustrated in FIG. 11, a lateral tear seam 31 may be provided to be connected to an upper portion of a tear seam 30 and to extend inward in the vehicle body width direction. The tear seam 31 is located at a position higher than the uppermost inner tether 16. When the internal pressure of a chamber on the upper side of the uppermost inner tether 16 becomes high, great tension is applied to the right end of the tear seam 31, and the tear seam 31 tears. This tear propagates from the tear seam 31 to the tear seam 30.

Figure 12:
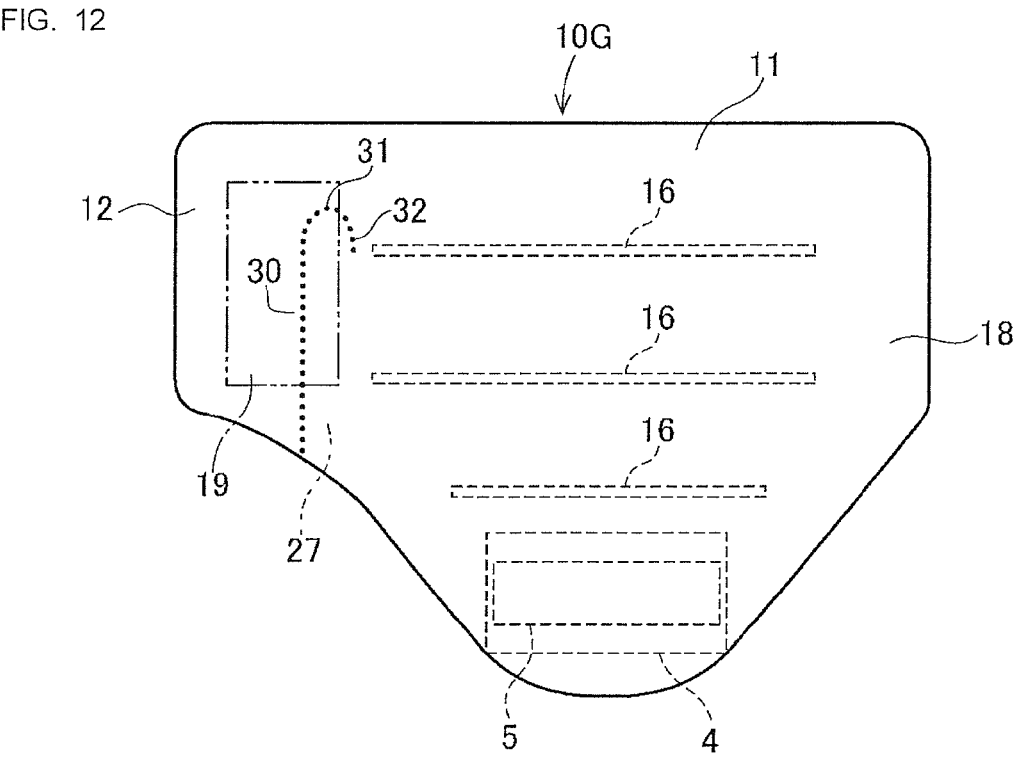
FIG. 12 is a front view of an airbag according to a further embodiment.

As in an airbag 10G illustrated in FIG. 12, a vertical tear seam 32 may be further provided to extend downward from a right end of a lateral tear seam 31. The vertical tear seam 32 sews panels 13 and 12 in a gas passage 27 between the uppermost inner tether 16 and a tear seam 30.

When the internal pressure of the gas passage 27 becomes high, great tension is applied to a lower end of the vertical tear seam 32, and a tear starts. This tear propagates to the tear seam 30 via the lateral tear seam 31.

Figure 13A:
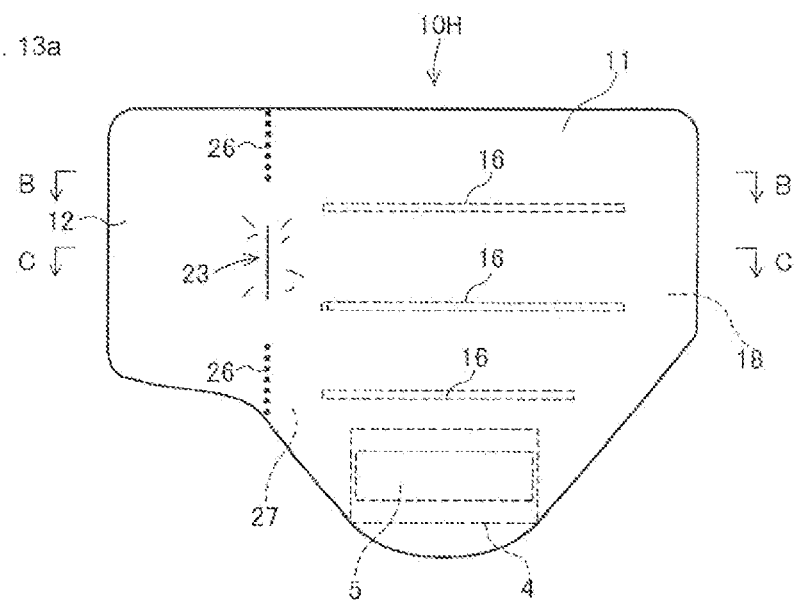
FIG. 13(a) is a front view of an airbag according to a further embodiment.
Figure 13B:
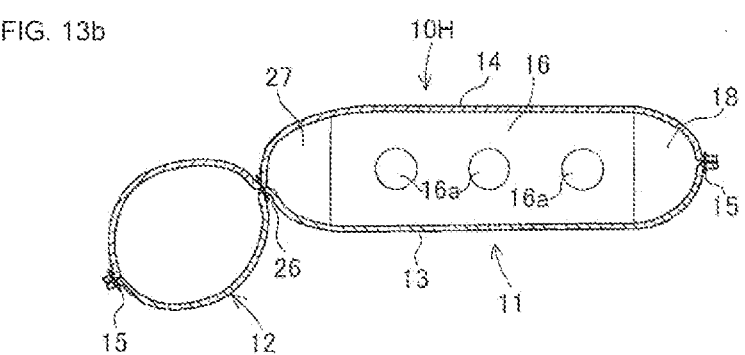
FIGS. 13(b) and 13(c) are cross-sectional views taken along lines B-B and C-C of FIG. 13(a), respectively.
Figure 13C:
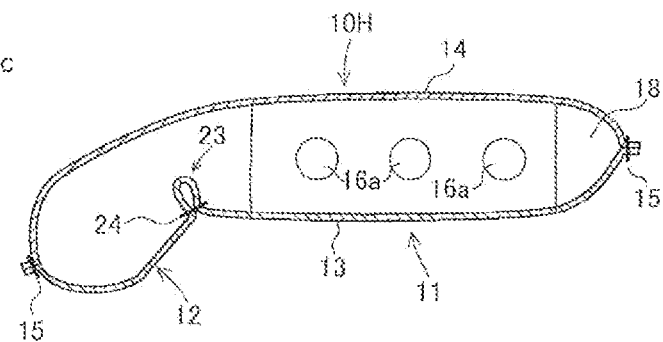

In an airbag 10H illustrated in FIGS. 13(a)-13(c), a separating portion is formed by upper and lower seams 26 and 26, and a tuck portion 23 is provided in a panel 13 between these seams 26 and 26. Since the tuck portion 23 is provided, when the airbag 10H inflates, a projecting part 12 protrudes to the vehicle body rear side. The seams 26 may be tear seams.

In an airbag 10I illustrated in FIGS. 14(a)-14(d), a body part 11 and a projecting part 12 are formed by a main bag 41 and a sub-bag 42 that are separate from each other, respectively, and the bags 41 and 42 are sewn with sewing thread 43. The bags 41 and 42 are each formed in a bag shape by folding back one panel and sewing a peripheral edge thereof with sewing thread 44 or 45. Apertures 46 are provided in contact surfaces of the bags 41 and 42. By sewing the contact surfaces of the bags 41 and 42 with the sewing thread 43 with the apertures 46 being opposed to each other, the airbag 10I is structured. While the apertures 46 are provided only in upper portions of the contact surfaces, they may be provided in, for example, intermediate portions or lower portions.

In the present invention, one panel may form an occupant side, a non-occupant side, and an inner tether. This example is illustrated in FIG. 15.

Figure 15:
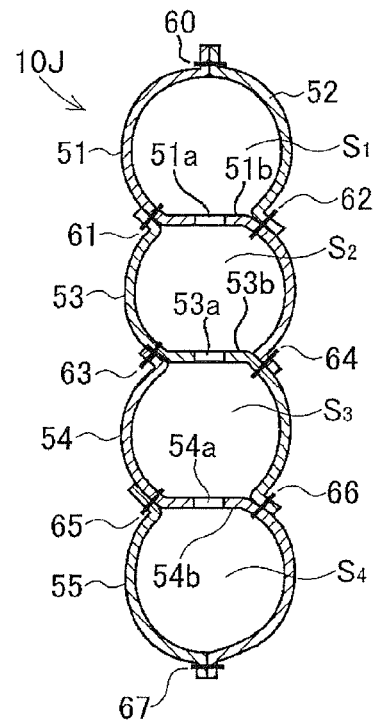
FIG. 15 is a longitudinal sectional view of an airbag according to a further embodiment.

An airbag 10J illustrated in FIG. 15 is divided into four chambers, that is, a first chamber $S_1$ at the top, a second chamber $S_2$ that is the second from the top, a third chamber $S_3$ that is the third from the top, and a fourth chamber $S_4$ at the bottom. The airbag 10J is formed by five panels 51 to 55. The panel 51 forms an occupant side surface of the uppermost first chamber $S_1$, a first inner tether 51b, and a non-occupant side surface of the second chamber $S_2$. The panel 52 forms a non-occupant side surface of the first chamber $S_1$. The panel 53 forms an occupant side surface of the second chamber $S_2$, a second inner tether 53b, and a non-occupant side surface of the third chamber $S_3$. The panel 54 forms an occupant side surface of the third chamber $S_3$, a third inner tether 54b, and a non-occupant side surface of the fourth chamber $S_4$. The panel 55 forms an occupant side surface of the fourth chamber $S_4$.

The inner tethers 51b, 53b, and 54b have apertures 51a, 53a, 54a, respectively, which allow the upper and lower chambers to communicate with each other.

Upper edges of the panels 51 and 52 are sewn with sewing thread 60. The occupant side surfaces of the panels 51 and 53 are sewn with sewing thread 61, the occupant side surfaces of the panels 53 and 54 are sewn with sewing thread 63, and the occupant side surfaces of the panels 54 and 55 are sewn with sewing thread 65.

The non-occupant side surface of the panel 51 and the panel 52 are sewn with sewing thread 62, the non-occupant side surfaces of the panels 51 and 53 are sewn with sewing thread 64, and the non-occupant side surfaces of the panels 53 and 54 are sewn with sewing thread 66. Lower edges of the panels 54 and 55 are sewn with sewing thread 67.

In this airbag 10J, gas from an inflator flows from the chamber $S_4$, passes through the apertures 54a, 53a, and 51a, and inflates the chambers $S_4$ to $S_1$ in order. In a completely inflated state, a front view of the airbag 10J from the occupant side is similar to FIG. 1. Although not illustrated in FIG. 15, the airbag 10J also includes an outer tether 19 such that a projecting part protrudes to the vehicle body read side, in a manner similar to that of FIG. 2.

Figure 16:
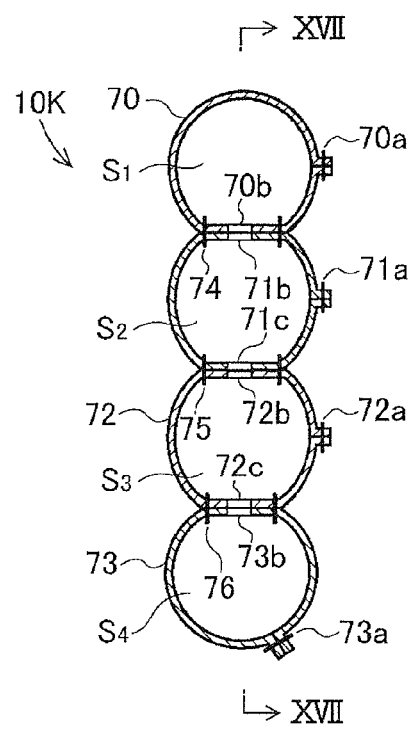
FIG. 16 is a longitudinal sectional view of an airbag according to a further embodiment.
Figure 17:
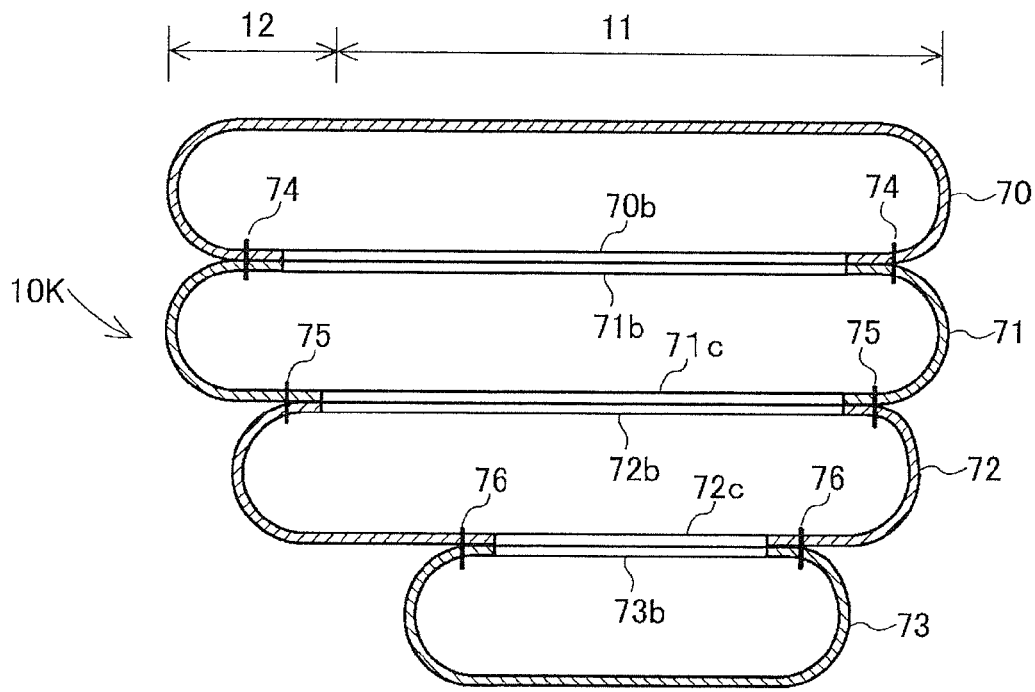
FIG. 17 is a cross-sectional view taken along line XVII-XVII of FIG. 16.

In the present invention, as illustrated in FIGS. 16 and 17, an airbag 10K formed by connecting a plurality of small bags extending in the horizontal direction in multiple vertical tiers may be used. In FIGS. 16 and 17, four small bags 70, 71, 72, and 73 are provided to form four chambers $S_1$ to $S_4$ arranged in the up-down direction. The small bags 70 to 73 are each formed in the shape of a bag by folding back one panel and sewing a peripheral edge thereof with sewing thread 70a, 71a, 72a, or 73a. Contact surfaces of the small bags 70 and 71, contact surfaces of the small bags 71 and 72, and contact surfaces of the small bags 72 and 73 are sewn with sewing thread 74, 75, and 76, respectively. The contact surfaces have apertures 70b, 71b, 71c, 72b, 72c, and 73b each of which allows the upper and lower chambers to communicate with each other. As illustrated in FIG. 17, the airbag 10K also includes a body part 11 and a projecting part 12 projecting leftward from the body part 11. Also, the airbag 10K includes an outer tether that protrudes the projecting part 12 from the body part 11 to the vehicle body rear side.

In this airbag 10K, a separating portion that separates the body part 11 and the projecting part 12 may also be provided.

Figure 18:
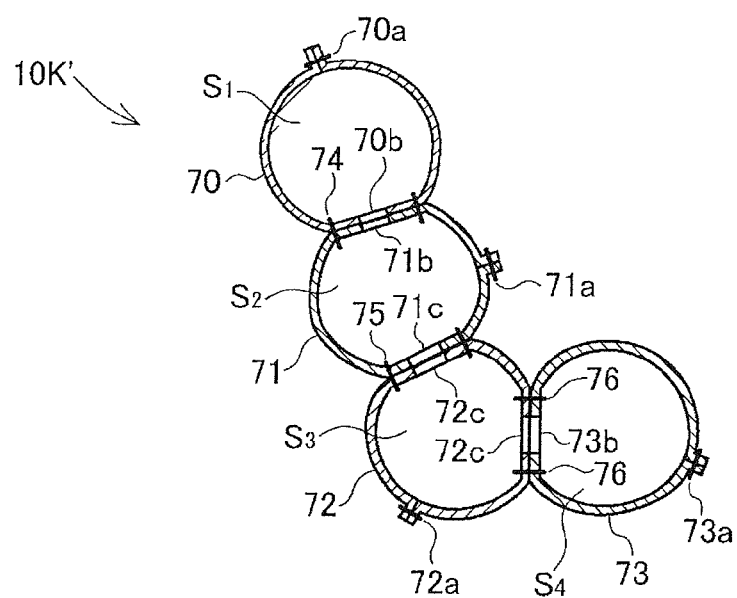
FIG. 18 is a longitudinal sectional view of an airbag according to a further embodiment.

While the bottom face of the upper small bag and the top face of the lower small bag, which are adjacent to each other, are sewn together in the airbag 10K of FIGS. 16 and 17, adjacent small bags may be sewn at portions other than the bottom face and the top face, as illustrated in FIG. 18.

In an airbag 10K' illustrated in FIG. 18, first, second, and third small bags 70, 71, and 72 are each sewn at portions slightly shifted in the front-rear direction from the bottom face and the top face, and the third and fourth small bags 72 and 73 are sewn at side faces thereof. Thus, in an inflated state, the airbag 10K' is curved along an instrument panel. Other structures of the airbag 10K' are similar to those of the airbag 10K, and the same reference numerals denote the same components.

The above-described embodiments are just examples of the present invention, and the present invention may adopt embodiments other than the above embodiments. For example, while the interior of the airbag body part is divided into four chambers in the above-described embodiments, it may be divided into two, three, or five or more chambers.

REFERENCE SIGNS LIST

1: leg airbag apparatus
2: interior panel
4: retainer
5: inflator
10, 10A-10K, 10K': airbag
11: body part
12: projecting part
19, 19A: outer tether
21, 23: tuck portion
26: seam
30, 31, 32: tear seam
41: main bag
42: sub-bag
51-55: panel
70-73: small bag

The invention claimed is:
1. A leg airbag apparatus comprising:
an airbag that deploys in an area including a position in front of legs of an occupant of an automobile;
an instrument panel holding a retainer that stores the airbag in a folded state therein; and
an inflator that inflates the airbag, wherein the airbag includes a body part that inflates in front of the occupant, and a projecting part that projects outward in a vehicle body width direction from the body part, wherein, in an inflated state of the airbag, a length from an occupant center line of the airbag to an outer end of the projecting part in the vehicle body width direction is longer than a length from the occupant center line of the airbag to an inner end of the airbag at a side opposite to the projecting part in the vehicle body width direction, and the projecting part protrudes from the body part to a vehicle body rear side, an occupant side panel of the airbag is partly folded inwardly to connect together to define a tuck portion, the tuck portion being provided near a boundary portion between the projecting part and the body part in the occupant side panel of the airbag such that the projecting part protrudes to the vehicle body rear side, and the airbag inflates and deploys upward along the instrument panel from a lower part of the instrument panel.

2. The leg airbag apparatus according to claim 1, wherein the projecting part projects outward in the vehicle body width direction from at least an upper portion of the body part.

3. The leg airbag apparatus according to claim 1, wherein, in the inflated state of the airbag, the length from the occupant center line of the airbag to the outer end of the projecting part in the vehicle body width direction is longer by 80 to 170 mm than the length from the occupant center line of the airbag to the inner end of the airbag in the vehicle body width direction.

4. The leg airbag apparatus according to claim 1, wherein, in the inflated state of the airbag, the projecting part protrudes by 80 to 170 mm from the body part to the vehicle body rear side.

5. The leg airbag apparatus according to claim 1, wherein a separating portion is provided to separate the projecting part and the body part, and a communicating portion that allows the projecting part and the body part to communicate with each other is provided in an upper portion or an intermediate portion in an up-down direction of the separating portion, and wherein gas from the inflator is supplied to the body part, and then flows from the body part into the projecting part through the communicating portion.

6. The leg airbag apparatus according to claim 5, wherein the separating portion is formed by a panel.

7. The leg airbag apparatus according to claim 6, wherein the panel comprises a hole communicating between the body part and the projecting part.

8. The leg airbag apparatus according to claim 6, wherein the communicating portion is arranged at the upper portion of the panel, and another communicating portion is arranged at a lower portion of the panel in the up-down direction, to allow the projecting part and the body part to communicate with each other.

9. The leg airbag apparatus according to claim 1, wherein an interior of the body part is divided into a plurality of chambers by an inner tether extending in the vehicle body width direction.

10. The leg airbag apparatus according to claim 1, wherein the airbag is folded up after the projecting part is folded toward a non-occupant side of the body part.

11. The leg airbag apparatus according to claim 1, wherein, when the inflator starts, inflation of the projecting part is completed after inflation of the body part is completed.

12. An automobile comprising the leg airbag apparatus according to claim 1.

13. The leg airbag apparatus according to claim 1, further comprising:

a separating portion including a panel extending parallel to the occupant center line of the airbag to separate the projecting part and the body part, and a communicating portion arranged on the separating portion for allowing the projecting part and the body part to communicate with each other, wherein a distance from the separating portion to the occupant center line of the airbag in the vehicle body width direction is substantially equal to a distance from the occupant center line of the airbag to the inner end of the airbag in the vehicle body width direction, and an upper surface of the projecting part between the outer end and the separating portion is lower than an upper surface of the body part between the separating portion and the inner end of the airbag.

* * * * *